United States Patent Office 3,357,012
Patented Dec. 5, 1967

1

3,357,012
VELOCITY CORRECTED RESOLVER
ENCODING SYSTEM
James E. Brook, Maywood, N.J., assignor to The
Bendix Corporation, Teterboro, N.J., a corporation
of Delaware
Filed Sept. 21, 1964, Ser. No. 397,743
11 Claims. (Cl. 340—347)

ABSTRACT OF THE DISCLOSURE

A velocity corrected resolver encoding system including a resolver phase shifter operatively connected to serve as an angle encoder and a frequency multiplier means operatively connected to said resolver to provide an output count signal wave.

---

This invention relates to a velocity corrected resolver encoding system and, more particularly, to an absolute or whole word read out system, including a resolver phase shifter operatively connected to serve as an angle encoder to generate quantum angle data of any desired resolution and including means to compensate for a velocity error generated by the resolver in the encoding system, and which resolver phase shifter may be of a type such as described in a copending U.S. application Serial No. 392,-221, filed August 26, 1964 by James E. Brook and Frank A. Hanusek and assigned to The Bendix Corporation, assignee of the present invention.

In the present invention, there is provided a resolver transducer which serves to produce two substantially sinusoidal electrical signals. Both signals have the same frequency, amplitude, and wave form and are adapted to vary linearly in phase, one with respect to the other, when the transducer shaft is displaced from a zero position. The phase of the variable phase signals may move through three hundred and sixty electrical degrees for each sector of a mechanical rotation of the shaft in the general case where a multi-speed resolver is employed. For example, in using an 18 speed resolver, it may be desired to fix the unit shaft displacement of ten mechanical degrees, in which case the phase of variable signals will shift through three hundred and sixty electrical degrees for each ten degrees of rotation of the shaft.

In addition to the resolver, there may be provided a lag-lead phase shifter network. The resolver may include primary and secondary windings which are movable with respect to each other by angular adjustment of an operating shaft. An alternating current signal is applied to the primary winding. The secondary winding may include two interconnected coils which are oriented at right angles with respect to each other and inductively coupled to a primary winding, including a pair of interconnected coils arranged in spaced quadrature so that the two output signals are induced into the secondary winding and the two output signals from the secondary winding are combined in a phase shifting network. The amount of phase shift of the combined voltage is proportional to the angle between the primary and secondary windings so as to provide an absolute measure of the quantized angular position of the shaft.

An object of invention is to provide a precise angle encoding system in which a resolver transducer and phase network is operatively connected in the system so as to effectively apply input shaft angle information during a sinusoidal sample time defined by the phase relation of a pair of side band output signals from the resolver transducer.

Another object of invention is to provide in the aforenoted system means for effecting an exact correction for changes in the sampled data during the sinusoidal time due to rotation of the angularly adjustable operating shaft.

Another object of invention is to provide a novel means for correcting for velocity error in the aforenoted resolver encoding system in which the clock frequency of the alternating current providing the measuring medium of the quantum angle data of the shaft is adjusted by the velocity of the transducer shaft as well as the relative zero across over points of the pair of sinusoidal side band signals relating to the unit of shaft displacement to be measured so as to give an exact correction of the measuring medium equivalent to $\omega_0 + \omega_s$, which is then multiplied in a frequency multiplier by an integer $n$ to effect a measuring signal of fine resolution.

Another object of invention is to provide a simple and flexible system of translating a shaft angle input into an absolute or whole word read output, including means whereby the shaft velocity of a resolver transducer (or its time integral, angle) may be superimposed upon the angular velocity of a sinusoidal carrier wave through a resolver phase shifter so as to provide two separated side band signals, one side band signal being equivalent to the sum of the shaft velocity and the carrier wave frequency and the other side band signal being equivalent to the difference between the shaft velocity and the carrier wave frequency, one of said side band signals being multiplied by an integer $n$ to yield a count signal equivalent to that of a resolver having $np$ poles so as to provide a resolver with a whole word read out encoding system of exceedingly fine resolution, and including in such system a pair of zero crossing detectors, each responsive respectively to a different one of the side band signals so as to mark the events of zero crossings and to initiate in one case the operation of an electronic counter to count the cycles of the frequency multiplied signal and, in the other case, to terminate the count of the cycles of said frequency multiplied by the electronic counter.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

Figure 1:
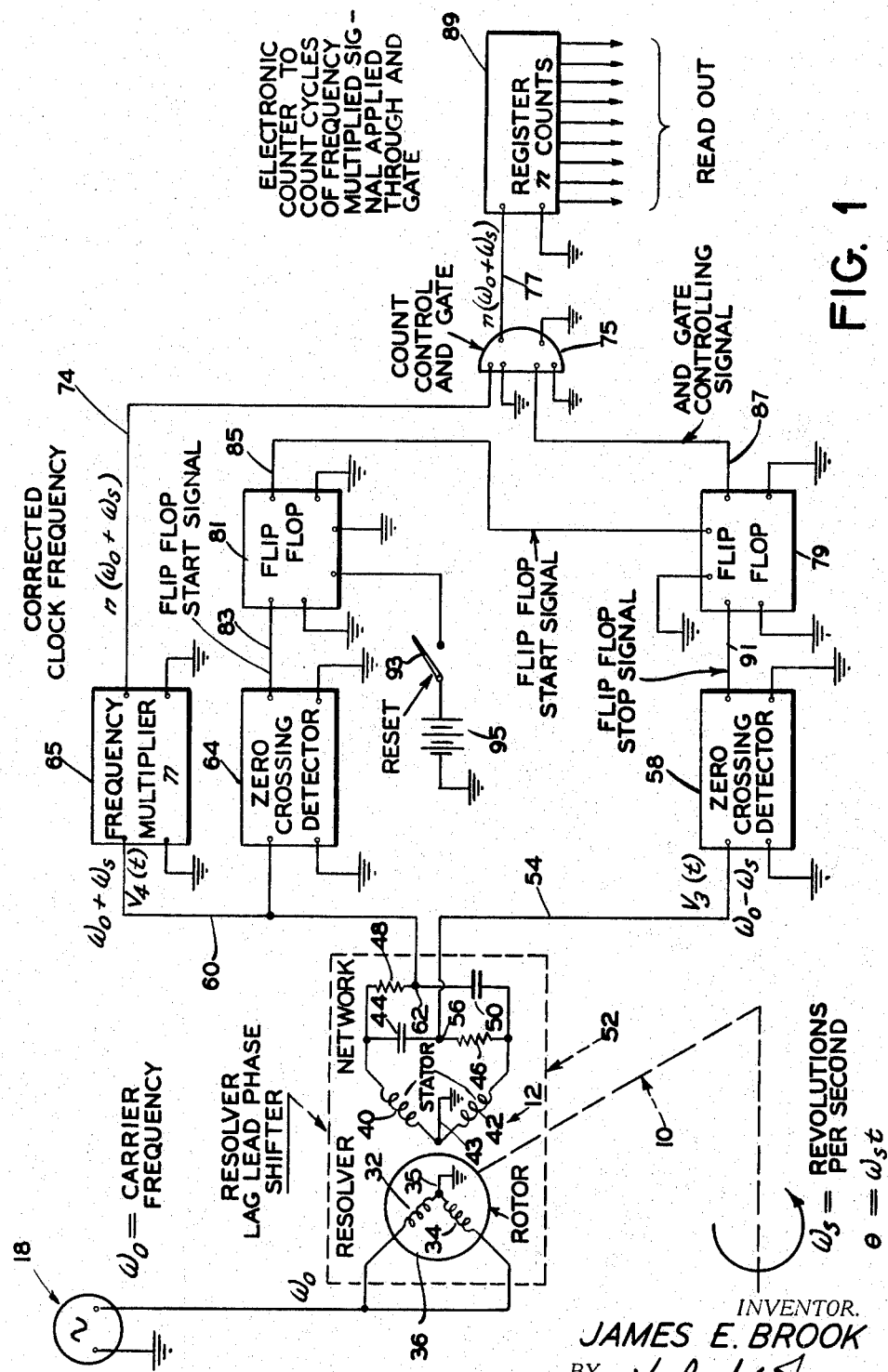
FIGURE 1 is a schematic wiring diagram of a resolver encoding system embodying the present invention.

Referring to the drawing of FIGURE 1, there is illustrated an electronic system which is arranged to transfer the angular input of a shaft 10 into an absolute or whole word read out signal indicative of the angular input data applied to the shaft 10. A two-pole resolver 12 has been shown so as to simplify the presentation, although a multipole resolver may normally be used to implement a practical system where both high accuracy as well as high resolution are desired.

In the drawing of FIGURE 1, there is electrically connected across a source of alternating current 18 a winding 32 and a winding 34, both of which are ground connected at 35 and carried by a rotor element 36 of the resolver 12. The source of alternating current 18 may be of a highly accurate, constant frequency of 400 c.p.s. type. The windings 32 and 34 are arranged in spaced quadrature and in cooperative relation with a stator winding 40 and a stator winding 42, both of which are ground connected at 43. The stator windings 40 and 42 are also arranged in spaced quadrature and are inductively coupled to the rotor windings 32 and 34 of the resolver 12, in a variable coupling relation.

There is further provided a lag-lead phase shifter network in which a capacitor 44 and a resistor element 46 are serially connected across the opposite output terminals of the stator windings 40 and 42 of the resolver 12 while a second resistor 48 and capacitor 50 are connected across the aforesaid opposite output terminals of the stator windings 40 and 42 of the resolver 12 so as to constitute a resolver lag-lead phase shifter network 52. There is further provided an output line 54 leading from a point 56 intermediate the serially connected capacitor 44 and resistor 46 to an input of a zero crossing detector 58 which may be of a conventional type or of a type disclosed in a heretofore abandoned U.S. Application Serial No. 392,154, filed August 26, 1964 by James E. Brook.

Another output line 60 leads from a point 62 intermediate the serially connected resistor 48 and capacitor 50 to an input of a second zero crossing detector 64 identical to the zero crossing detector 58.

The alternating current applied to the rotor windings 32 and 34 of the resolver 12 from the constant source of alternating current 18 is shown in the drawing of FIGURE 1 as represented by the symbol $\omega_o$ which is equal to the carrier angular velocity while the angular velocity imparted to the rotor 36 by the shaft 10 is indicated by the symbol $\omega_s$ as equal to the revolutions per second of the input shaft 10.

Further, the electrical output signals from the resolver lag-lead phase shifter 52 are separated side band sinusoidal signal waves $(\omega_o \pm \omega_s)$ in which the output line 54 has a side band signal wave equal to $\omega_o - \omega_s$ upon angular movement of the shaft 10 in one sense and a side band signal wave equal to $\omega_o + \omega_s$ upon angular movement of the shaft 10 in an opposite sense while output line 60 has another side band signal wave equal to $\omega_o + \omega_s$ upon the angular movement of the shaft 10 in said one sense and a side band signal wave equal to $\omega_o - \omega_s$ upon the angular movement of the shaft 10 in said opposite sense.

Through the operation of the resolver lag-lead phase shifter 52, the velocity equal to $\omega_s$ of the resolver shaft 10 (or its time integral, angle) is superimposed, in accordance with the Doppler principle, upon the carrier velocity $\omega_o$ supplied by the source of alternating current 18. Upon the angular movement or rotation of the shaft 10 in the one sense shown in FIGURE 1, the separated side band signals $\omega_o - \omega_s$ and $\omega_o + \omega_s$ applied through the output lines 54 and 60, respectively, are then applied to the inputs of the identical zero crossing detectors 58 and 64 for purposes which will be explained hereinafter.

In addition, the output line 60 carrying the separated side band signal $\omega_o + \omega_s$ is connected to the input of an electronic frequency multiplier 65 so that this signal is, in effect, multiplied by an integer $n$ using techniques common in the communications field and indicated in the frequency multiplier 65 of FIGURE 1 by the letter $n$. Thus, the multiplier 65 as shown in FIGURE 1 yields a signal $n(\omega_o + \omega_s)$ which has been termed the corrected clock frequency. The uncorrected clock frequency is $n\omega_o$. This signal $n(\omega_o + \omega_s)$ in turn is applied to the output line 74 of the frequency multiplier 65 and is in turn applied through the outptu line 74 to the input of a count control AND gate 75. The AND gate 75 is normally in an open circuit condition so that the count signal $n(\omega_o + \omega_s)$ is not applied to the output line 77 until the AND gate 75 is closed by the operation of the flip-flop control gates 79 and 81 as hereinafter explained.

The flip-flop control gate 81 is controlled by the zero crossing detector 64 and is operatively connected to output line 83 leading from the zero crossing detector 64. Moreover, as shown graphically in FIGURE 3, upon sinusoidal output signal $(\omega_o + \omega_s)$ applied to the output line 60 reaching the indicated zero crossing point X, the zero crossing detector 64 applies an output signal to the line 83 leading to the input of the flip-flop control gate 81 which in turn applies an electrical signal to an output line 85 leading from the flip-flop control gate 81 to the flip-flop control gate 79.

The flip-flop control gate 79 thereupon applies an electrical signal to the output line 87 leading from the flip-flop control gate 79 to the count control AND gate 75. The AND gate 75 thereupon closes a circuit from the line 74 to the line 77 so that the count, or clock signal having a frequency equivalent to $n(\omega_o + \omega_s)$ may be applied from the frequency multiplier 65 to the electronic counter or register 89 which thereupon starts to count the cycles of the frequency multiplier signal applied thereto through the AND gate 75, as shown graphically in FIGURE 3.

Figure 3:
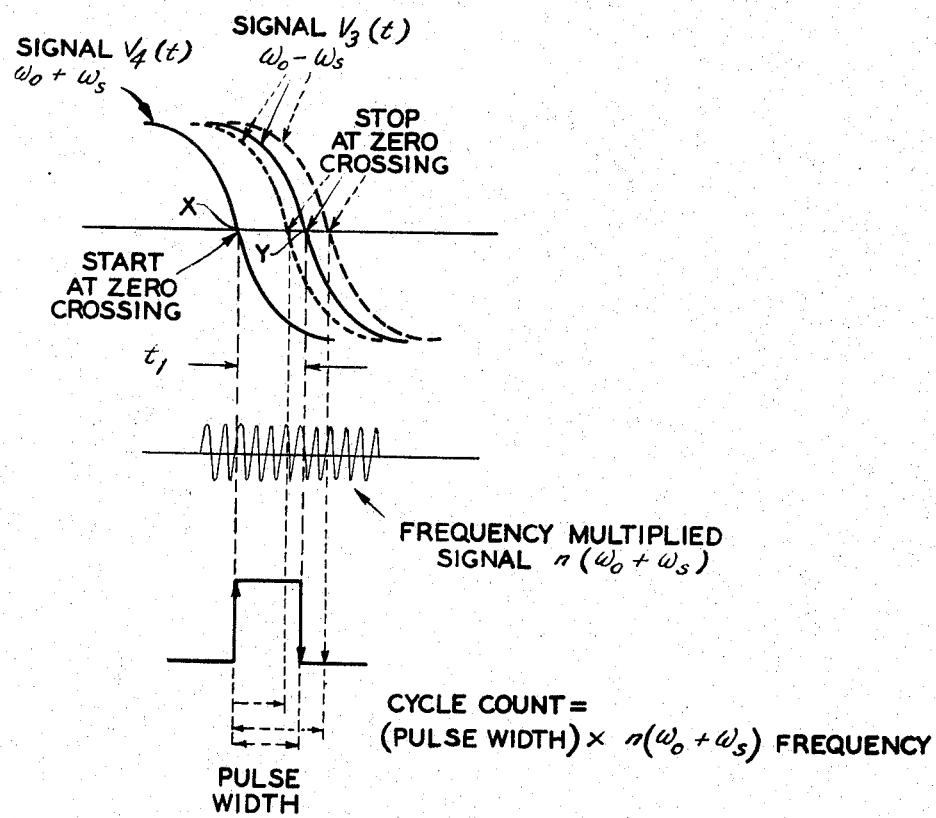
FIGURE 3 is a graphical representation showing the initiation of the start and stop signals for the counter by the zero crossing detectors shown in the schematic wiring diagram of FIGURE 1.

Thereafter, from the sinusoidal signal $(\omega_o - \omega_s)$ applied through the line 54 to the zero crossing detector 58, reaching the stop zero crossing signal point Y, shown graphically in FIGURE 3, there is applied through the output line 91 of the zero crossing detector 51 to the input of the flip-flop control gate 79 a signal which is thereupon effective to open the circuit between the line 85 and the line 87 leading to the control AND gate 75, in turn causing the AND gate 75 to open the circuit between the line 74 and 77, thereupon terminating the counting operations of the electronic counter or register 89. The counter control AND gate 75 remains in this open circiut condition until the flip-flop control gate 81 is reset for operation. This reset operation is normally performed by an automatic programmer, but may be readily effected by the operator closing a reset switch 93 directing current from a battery 95 to reset the flip-flop control gate 81. The reset operation is completed upon the operator opening the switch 93. Thereafter, the counting operation may be repeated upon the sinusoidal control signal applied to line 60, once again reaching a start zero condition as indicated graphical in FIGURE 3.

*Operation*

Figure 2:
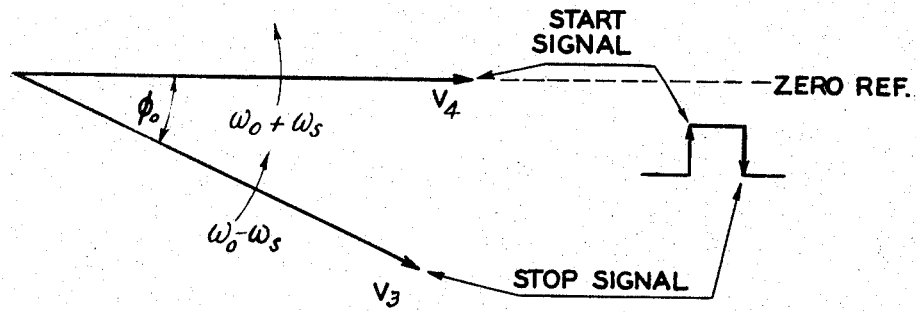
FIGURE 2 is a vectorial representation of the separated side band signals obtained from the outputs of the resolver lag-lead phase shifter network to effect the start and stop signals for controlling an electronic counter for counting the cycles of the frequency multiplied signal, as shown in the schematic wiring diagram of FIGURE 1.

The aforenoted operative arrangement of FIGURE 1 effectively corrects for inherent errors arising when the input shaft 10 is rotated at a constant velocity $\omega_s$. In this connection, consider the signals $V_3$ and $V_4$ of the vectorial presentation of FIGURE 2, at the instant when the phase angle is $\varphi_o$ and $V_4$ has just fired its zero crossing detector 64 to start the counting cycle of the register or electronic counter 89.

Now, if the input to the frequency multiplier 65 was connected directly to the output of the source of excitation current 18 rather than to the side band $\omega_o + \omega_s$ existing at point 62 of the resolver phase shifter network 52, it would be seen that at this instant $t_o$ of the firing of the crossing detector 64, the count control AND gate 75 is opened by the action of the flip-flop control gates 81 and 79 and the register 89 would start to accumulate the clock pulses at a rate proportional to $n\omega_o$. Moreover, as $V_3$ traverses the angle $\varphi_o$ at the angular velocity $\omega_o - \omega_s$ and reaches the former horizontal position of $V_4$ at the instant $t_1$, shown vectorially by FIGURE 2, then the count control AND gate 75 opens and, specifically, the following conditions will result:

(1)
$$t_1 - t_o = \frac{\phi_o}{\omega_o - \omega_s}$$

The phase angle at the instant $t_1$ is (2)
$$\phi_1 = \phi_o + 2\omega_s(t_1 - t_o) = \frac{\omega_o + \omega_s}{\omega_o - \omega_s}\phi_o$$

The count tallied in the register is proportional then to the angle denoted as $\phi_r$.

(3)
$$\phi_r = \omega_o(t_1 - t_o) = \frac{\omega_o}{\omega_o - \omega_s}\phi_o$$

As of the instant $t_1$ the system error, $\Delta$, is (4)
$$\Delta = \phi_r - \phi_1 = \frac{\omega_o}{\omega_o - \omega_s}\phi_o - \frac{\omega_o + \omega_s}{\omega_o - \omega_s}\phi_o$$

A casual inspection of Equation 4 indicates that the system error will disappear absolutely if the numerators, $\omega_o$, in the next to the last term is made to be $\omega_o + \omega_s$. Since the system significance of $\omega_o$ is that of the clock frequency, then the clock frequency should be derived from the side band $\omega_o + \omega_s$ which is there for the taking. To implement the ideal condition of a correct count at the terminating instant of sampling time, the system of FIGURE 1 will suffice.

In the system described in reference to formulae (1) through (4), the clock frequency $n\omega_o$ was to be fed directly to the AND gate. The improved system of FIGURE 1 includes the frequency multiplier 65 to synthesize the velocity corrected clock signal $n(\omega_o + \omega_s)$ and from which it may be concluded that the mutli-cycle resolver encoding system shown in FIGURE 1 is completely devoid of velocity errors.

Although only one embodiment of the invention has been illustrated and described, various changes in the form and relative arrangement of the parts which will now appear to those skilled in the art may be made without departing from the scope of the invention. Reference is, therefore, to be had to the appended claims for a definition of the limits of the invention.

What is claimed is:

1. The combination comprising a transducer, means for providing a sinusoidal carrier wave of constant angular velocity for energizing said transducer, first and second outputs for said transducer, a shaft angularly movable for adjusting said transducer, said shaft being movable at a constant angular velocity, said transducer including first means operative by said shaft to superimpose the angular velocity of the shaft upon the angular velocity of said sinusoidal carrier wave, and second means operatively connected to said first means for effecting at said first output a first side band sinusoidal signal wave of a frequency equivalent to a sum of the shaft velocity and carrier wave velocity and at said second output a second side band sinusoidal signal wave of a frequency equivalent to a difference between the shaft velocity and the carrier wave velocity, means operatively connected to said first output to multiply the frequency of said first side band signal wave by an integer so as to provide a sinusoidal output count signal wave, a first zero crossing detector operatively connected to the first output, a second zero crossing detector operatively connected to the second output, a gate to control the count signal wave, an electronic register to count cycles of the count signal wave, means operatively connecting said first and second zero crossing detectors to said control gate so as to render one of said zero crossing detectors effective to actuate said gate so as to apply the count signal wave to said register upon one of said side band signal waves passing through zero, and the other of said zero crossing detectors effective to actuate said gate so as to terminate the application of the count signal wave to said register upon the other of said side band signal waves passing through zero and thereby terminate the counting of the cycles of the count signal wave by said register.

2. The combination comprising a transducer, means for providing a sinusoidal carrier wave of constant angular velocity for energizing said transducer, first and second outputs for said transducer, a shaft angularly movable for adjusting said transducer, said shaft being movable at a constant angular velocity, said transducer including first means operative by said shaft to superimpose the angular velocity of the shaft upon the angular velocity of said sinusoidal carrier wave, and second means operatively connected to said first means for effecting at said first output a first side band sinusoidal signal wave of a frequency equivalent to a sum of the shaft velocity and carrier wave velocity and at said second output a second side band sinusoidal signal wave of a frequency equivalent to a difference between the shaft velocity and the carrier wave velocity, frequency multiplier means operatively conected to said first output to provide said first side band sinusoidal signal wave as an output count signal wave, an electronic counter, a gate operatively connected between the output count signal wave and the electronic counter to control application of the output count signal wave to the electronic counter, means controlled by one of said side band signal waves to render the control gate effective to apply the count signal wave to said electronic counter upon said one side band sinusoidal signal wave passing through zero whereupon said electronic counter may effectively count cycles of the count signal wave, and other means controlled by the other of said side band signals to render the control gate effective to terminate the application of the count signal to said electronic counter upon the other of said side band sinusoidal signal waves passing through zero and thereby terminate the counting of the cycles of the count signal by said counter.

3. In an encoder system, the combination comprising a resolver transducer including a set of rotor windings and a set of stator windings in inductive relation, a source of a constant frequency alternating current for energizing one of the set of windings so as to induce a sinusoidal carrier wave of constant angular velocity in the other of said set of windings, a control shaft for angularly positioning the set of rotor windings in relation to the set of stator windings and at a constant angular velocity so that angular velocity of the shaft may be superimposed upon the angular velocity of the sinusoidal carrier wave, a lag-lead phase shifter network connected across an output of the other set of windings, the lag-lead phase shifter network including first and second output means, the first output means providing a first side band sinusoidal signal wave of a frequency equivalent to a sum of the shaft velocity and carrier wave velocity, and the second output means providing a separated second side band sinusoidal signal wave of a frequency equivalent to a difference between the shaft velocity and the carrier wave velocity, a frequency multiplier means operatively connected to said first output means so as to multiply the frequency of the first side band signal wave by an integer, said frequency multiplier means having a third output means to yield a multicycle count signal wave having a frequency equivalent to the frequency of said first side band signal wave multiplied by said integer, a first zero crossing detector operatively connected to the first output means, a second zero crossing detector operatively connected to the second output means, an electronic register to count the cycles of the count signal wave, a control gate operatively connected between said third output means and said electronic register, means operatively connecting said first and second zero crossing detectors to said control gate, said first zero crossing detector being arranged to effect a first output pulse defining a zero reference condition upon the first side band sinusoidal signal wave passing through a zero crossing condition, said first output pulse being operatively effective through said conecting means to render said control gate effective in a sense to apply said count signal wave to said electronic register to start the counting of the cycles of the count signal wave by said register, said second zero crossing detector being arranged to effect a second output pulse defining a zero reference condition upon the second side band sinusoidal signal wave passing through a zero crossing condition, and said second output pulse being operatively effective through said connecting means to render said control gate effective in another sense to discontinue the application of said count signal wave to said electronic register so as to stop the counting of the cycles of the count signal wave by said register.

4. In an encoder system, the combination comprising a resolver transducer including a set of rotor windings and a set of stator windings in inductive relation, a source of a constant frequency alternating current for energizing one of the set of windings so as to induce a sinusoidal carrier wave of constant angular velocity in the other of said set of windings, a control shaft for angularly positioning the set of rotor windings in relation to the set of stator windings and at a constant angular velocity so that the angular velocity of the shaft may be superimposed upon the angular velocity of the sinusoidal carrier wave, a lag-lead phase shifter network connected across an output of the other set of windings, the lag-lead phase shifter network including first and second output means, the first output means providing a first side band sinusoidal signal wave of a frequency equivalent to a sum of the shaft velocity and carrier wave velocity, and the second output means providing a separated second side band sinusoidal signal wave of a frequency equivalent to a difference between the shaft velocity and the carrier wave velocity, a frequency multiplier means operatively connected to said first output means so as to multiply the frequency of the first side band signal wave by an integer, said first frequency multiplier means having a third output means to yield a multicycle count signal wave having a frequency equivalent to the frequency of said first side band signal wave multiplied by said integer, a first zero crossing detector operatively connected to the first output means, a second zero crossing detector operatively connected to the second output means, an electronic register to count the cycles of the count signal wave, gating means operatively connected between said third output means and said electronic register and controlled by said first and second zero crossing detectors so as to render said gating means effective in a first sense to apply said count signal wave to said electronic register to initiate a counting of the cycles of the count signal wave by said register upon the first side band sinusoidal signal wave passing through a zero crossing condition and to render said gating means effective in a second sense to cease the applying of said count signal wave to said electronic register to terminate the counting of the cycles of the count signal wave by said register upon the second side band sinusoidal signal wave passing through a zero crossing condition.

5. In an encoder system, the combination comprising a resolver transducer including a set of rotor windings and a set of stator windings in inductive relation, a source of a constant frequency alternating current for energizing one of the set of windings so as to induce a sinusoidal carrier wave of constant angular velocity in the other of said set of windings, a control shaft for angularly positioning the set of rotor windings in relation to the set of stator windings and at an angular velocity so that the angular velocity of the shaft may be superimposed upon the angular velocity of the sinusoidal carrier wave, a lag-lead phase shifter network connected across an output of the other set of windings, the lag-lead phase shifter network including first and second output means, the first output means providing a first side band sinusoidal signal wave of a frequency equivalent to a sum of the shaft velocity and carrier wave velocity, and the second output means providing a separated second side band sinusoidal signal wave of a frequency equivalent to a difference between the shaft velocity and the carrier wave velocity, and frequency multiplier means operatively connected to at least one of said output means to provide an output count signal wave.

6. In an encoder system, the combination comprising a resolver transducer including a set of rotor windings and a set of stator windings in inductive relation, a source of a constant frequency alternating current for energizing one of the set of windings so as to induce a sinusoidal carrier wave of constant angular velocity in the other of said set of windings, a control shaft for angularly positioning the set of rotor windings in relation to the set of stator windings and at an angular velocity so that the angular velocity of the shaft may be superimposed upon the angular velocity of the sinusoidal carrier wave, a lag-lead phase shifter network connected across an output of the other set of windings, the lag-lead phase shifter network including first and second output means, the first output means providing a first side band sinusoidal signal wave of a frequency equivalent to a sum of the shaft velocity and carrier wave velocity, and the second output means providing a separated second side band sinusoidal signal wave of a frequency equivalent to a difference between the shaft velocity and the carrier wave velocity, a first zero crossing detector operatively connected to the first output means, a second zero crossing detector operatively connected to the second output means, gating means operatively controlled by said first and second zero crossing detectors to effect a control function and frequency multiplier means operatively connected to at least one of said output means to provide an output count signal wave.

7. The combination defined by claim 6 including an electronic register to count cycles of said output count signal wave, and said gating means being so controlled by said first and second zero crossing detectors as to initiate application of said count signal wave to said register upon said first side band sinusoidal signal wave passing through a zero crossing condition and to terminate the application of said count signal wave to said register upon said second side band sinusoidal signal wave passing through a zero crossing condition.

8. In an encoder system comprising a resolver transducer including a rotor having a pair of windings arranged in spaced quadrature, a stator having a pair of windings arranged in spaced quadrature, said pair of rotor and stator windings being variably inductively coupled, a source of a constant frequency alternating current for energizing one of said pair of windings so as to induce a sinusoidal carrier wave in the other pair of windings, a shaft for angularly positioning the pair of rotor windings in relation to the pair of stator windings at an angular velocity so as to vary the inductive coupling between said rotor and stator windings and superimpose the angular velocity of the shaft uopn the angular velocity of the sinusoidal carrier wave, a lag-lead phase shifter network connected across output conductors of said other pair of windings, the lag-lead phase shifter network including first and second output means, frequency multiplier means operatively connected to at least one of said output means to provide an output count signal wave.

9. The combination defined by claim 8 in which the first output means provides a first side band sinusoidal signal wave of a frequency equivalent to a sum of the shaft velocity and the velocity of the sinusoidal carrier wave, the second output means provides a second side band sinusoidal signal wave of a frequency equivalent to a difference between the shaft velocity and the velocity of the sinusoidal carrier wave, and in which the claimed combination includes means responsive to the phase relation of said first and second side band signal waves to control said output count signal wave.

10. The combination defined by claim 8 including means to control said output count signal wave in response to phase conditions of output signal waves at said first and second output means.

11. The combination defined by claim 10 including an electronic register to count cycles of said output count signal wave effective during an interval of time determined by said control means in response to said phase conditions.

References Cited

UNITED STATES PATENTS

| | | | |
|---|---|---|---|
| 2,717,987 | 9/1955 | Hagen | 340—207 |
| 2,894,256 | 7/1959 | Kronacher | 340—347 |
| 2,930,033 | 3/1960 | Webb | 340—347 |
| 2,987,717 | 6/1961 | Altonji | 340—347 |
| 2,991,462 | 7/1961 | Hose | 340—347 |
| 3,034,053 | 5/1962 | Lanning | 324—83 |
| 3,277,461 | 10/1966 | Selvin | 340—347 |

DARYL W. COOK, *Acting Primary Examiner.*

J. H. WALLACE, *Assistant Examiner.*